Patented June 5, 1934

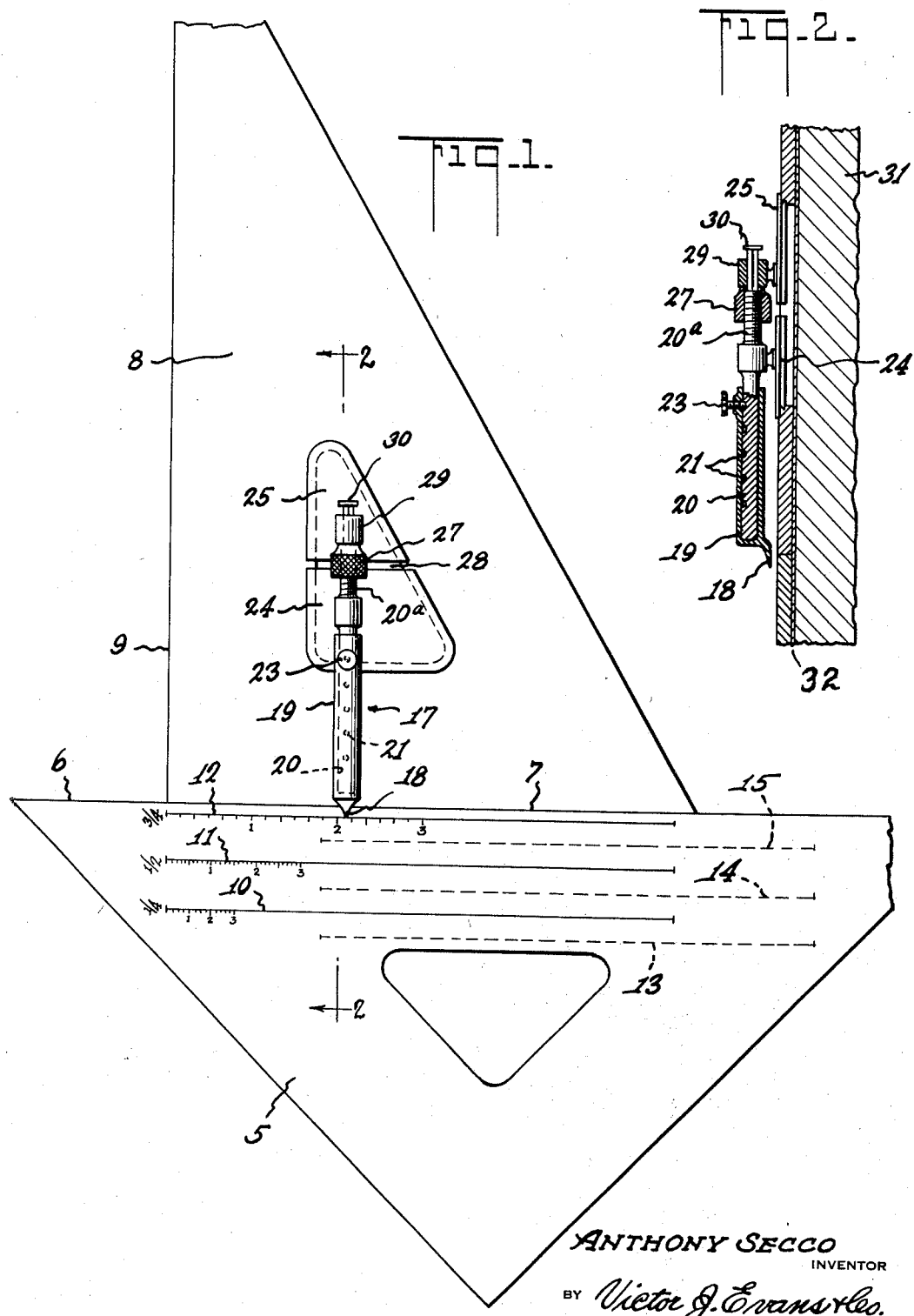

1,962,038

UNITED STATES PATENT OFFICE 1,962,038

DRAFTING INSTRUMENT

Anthony Secco, New York, N. Y.

Application September 26, 1932, Serial No. 634,955

1 Claim. (Cl. 33—110)

This invention relates to drafting means and particularly to such means employed in drawing parallel lines.

An object of the invention is to provide drafting means which will eliminate the use of the usual triangular scale rule and the dividers employed therewith and thereby facilitate the drawing of parallel lines in scale.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claim.

In the drawing:

Fig. 1 is a plan view of the apparatus, partly broken away; and

Fig. 2 is a section taken approximately on the line 2—2 of Fig. 1.

Referring to the drawing for a more detailed description thereof, the numeral 5 indicates a triangle having a straight edge 6 against which lies a straight edge 7 of a right angle triangle 8, having a straight edge 9 at right angles to the edge 7 and at right angles therefore to the straight edge 6 of the triangle 5.

The triangle 5 has scales 10, 11 and 12 ruled on the upper side thereof and scales 13, 14 and 15 on the underside thereof. The mentioned scales are all different, those designated by the numerals 10, 11 and 12 being respectively scales representing a quarter inch to the foot, a half inch to the foot and three-fourths of an inch to the foot. The scales 13, 14 and 15 may be made to represent any number of feet to the fraction of an inch. Removably secured to the triangle 8 is an indicator 17 movable to any one of the scales on the triangle 5. The indicator 17 comprises an end point 18 on a sleeve 19, into which fits a short rod 20 having aligned depressions 21 therein, as shown in Fig. 2. The sleeve 19 has projections spaced correspondingly to the mentioned depressions. The mentioned projections are short enough so that the sleeve may be moved to any scale desired. A set screw 23 passes through the wall of the sleeve 19 and bears against the rod 20 to hold the sleeve in adjusted position thereon.

Plates 24 and 25, notched at their edges and fitting into notches in the triangle 8, as shown in Fig. 2, are also carried by the rod 20. The plate 24 is fixed on said rod while the plate 25 is movable. The rod 20 has a threaded portion 20a, on which works a nut 27 which is employed to move the plate 25 against the edge of the triangle adjacent the aperture 28 thereof, said plate 25 being carried on a squarely apertured sleeve 29 which encircles the square upper portion of the rod 20, said sleeve 29 being pushed against the head 30 of the rod by the nut 27.

In Fig. 2, the numeral 31 indicates a drawing board, while the numeral 32 indicates the paper on which the drawing is being made and on which parallel lines are to be drawn by the use of the apparatus described. If parallel lines are to be drawn at a distance apart on a scale of three-fourths of an inch to the foot, the indicator is moved until the point 18 is at the scale 12, as shown in Fig. 1. A line is then drawn along the straight edge 9, the position of the indicator on the scale 12 being noted. If it is desired to draw a line parallel to the first drawn line and at a distance representing three feet, as shown on the scale 12, the triangle 8 would be moved to the right a distance equal to three main subdivisions of the scale. If scale 10 is to be used in drawing parallel lines, the indicator 17 is moved downwardly to that scale, which is used in the same manner as described for scale 12. If it is desired to use one of the scales 13, 14, or 15, the triangle 5 is turned over. It will thus be seen that I have provided apparatus whereby parallel lines may be readily drawn.

What is claimed is:

The combination with a straight edged instrument having different linear scales thereon parallel to each other and to the straight edge, of an apertured drawing instrument having two straight edges at right angles to each other with one of the said edges slidably engaging the straight edge of the first mentioned instrument, two spaced relatively movable plates mounted in the aperture of said drawing instrument, means for moving said plates in opposite directions for clamping action including, a rod secured to one of said plates and having an end portion thereof non-circular in cross section, a sleeve secured to the other of said plates and slidably receiving the non-circular end of said rod, an adjusting nut threaded on said rod for movement longitudinally thereof and engagement with an end of said sleeve, and indicating means cooperable with said above mentioned scales comprising a pointed sleeve longitudinally adjustable on said rod at the end thereof opposite the non-circular end, and means for holding said pointed sleeve in adjusted position.

ANTHONY SECCO.